United States Patent
Oya

(10) Patent No.: US 7,494,702 B2
(45) Date of Patent: Feb. 24, 2009

(54) NEAR-INFRARED RAY SHIELDING FILM

(75) Inventor: Taro Oya, Gifu (JP)

(73) Assignee: Teijin Dupont Films Japan Limited, Tokyo (JP)

(*) Notice: Subject to any disclaimer, the term of this patent is extended or adjusted under 35 U.S.C. 154(b) by 279 days.

(21) Appl. No.: 10/577,149

(22) PCT Filed: Oct. 26, 2004

(86) PCT No.: PCT/JP2004/016194

§ 371 (c)(1),
(2), (4) Date: Sep. 26, 2006

(87) PCT Pub. No.: WO2005/040868

PCT Pub. Date: May 6, 2005

(65) Prior Publication Data

US 2007/0273964 A1 Nov. 29, 2007

(30) Foreign Application Priority Data

Oct. 27, 2003 (JP) ............................. 2003-365902

(51) Int. Cl.
B32B 7/02 (2006.01)
B32B 17/10 (2006.01)
B32B 27/08 (2006.01)
B32B 27/30 (2006.01)
B32B 27/36 (2006.01)

(52) U.S. Cl. ................. 428/212; 428/213; 428/215; 428/216; 428/426; 428/430; 428/480; 428/483; 359/350; 359/359

(58) Field of Classification Search ............... None
See application file for complete search history.

(56) References Cited

U.S. PATENT DOCUMENTS

| | | | | |
|---|---|---|---|---|
| 5,126,880 A * | 6/1992 | Wheatley et al. | ............ | 359/587 |
| 6,024,455 A * | 2/2000 | O'Neill | ............ | 359/530 |
| 6,045,894 A * | 4/2000 | Jonza et al. | ............ | 428/212 |
| 6,352,761 B1 * | 3/2002 | Hebrink et al. | ............ | 428/212 |
| 6,589,649 B2 * | 7/2003 | Oya et al. | ............ | 428/343 |
| 6,991,849 B2 * | 1/2006 | Oya | ............ | 428/353 |
| 7,031,058 B2 * | 4/2006 | Oya et al. | ............ | 359/443 |
| 2001/0046595 A1 * | 11/2001 | Moran et al. | ............ | 428/212 |
| 2003/0008162 A1 * | 1/2003 | Oya et al. | ............ | 428/480 |
| 2003/0053215 A1 * | 3/2003 | Condo et al. | ............ | 359/580 |
| 2003/0186040 A1 * | 10/2003 | Oya | ............ | 428/304.4 |
| 2004/0004760 A1 * | 1/2004 | Oya et al. | ............ | 359/443 |
| 2004/0069977 A1 * | 4/2004 | Oya et al. | ............ | 252/587 |
| 2005/0014011 A1 * | 1/2005 | Oya | ............ | 428/480 |
| 2007/0090557 A1 * | 4/2007 | Oya | ............ | 264/173.15 |
| 2007/0195412 A1 * | 8/2007 | Oya et al. | ............ | 359/487 |
| 2007/0264447 A1 * | 11/2007 | Oya et al. | ............ | 428/1.31 |

FOREIGN PATENT DOCUMENTS

| | | | |
|---|---|---|---|
| EP | 1 350 618 | * | 10/2003 |
| JP | 4-95901 A | | 3/1992 |
| JP | 4-278324 A | | 10/1992 |
| JP | 4-295804 A | | 10/1992 |
| JP | 4-313704 A | | 11/1992 |
| JP | 5-193040 A | | 8/1993 |
| JP | 2001-154595 A | | 6/2001 |
| JP | 2002-71940 A | | 3/2002 |
| JP | 2002-509271 A | | 3/2002 |
| JP | 2002-138203 A | | 5/2002 |
| JP | 2003-2985 A | | 1/2003 |
| JP | 2003-075920 | * | 3/2003 |
| JP | 2003-515754 A | | 5/2003 |
| JP | 2003-320632 A | | 11/2003 |
| JP | 2004-74764 A | | 3/2004 |
| WO | WO 95/01703 A1 | | 1/1995 |
| WO | WO 97/01778 A1 | | 1/1997 |
| WO | WO 99/36258 A1 | | 7/1999 |
| WO | WO 01/38907 A1 | | 5/2001 |
| WO | WO 03/000779 | * | 1/2003 |
| WO | WO 03/074272 | * | 9/2003 |

* cited by examiner

Primary Examiner—Vivian Chen
(74) Attorney, Agent, or Firm—Sughrue Mion, PLLC

(57) ABSTRACT

A near-infrared ray shielding film which has high adhesion between layers, is substantially transparent, can shield a wide near-infrared region at a high level and is free from electromagnetic interference. This near-infrared ray shielding film is a multi-layer laminated film consisting of a first laminated film portion and a second laminated film portion, each consisting of first layers and second layers alternated with each other, and the average thickness of all the layers of the second laminated film portion is 1.05 to 1.6 times the average thickness of all the layers of the first laminated film portion.

6 Claims, No Drawings

NEAR-INFRARED RAY SHIELDING FILM

FIELD OF THE INVENTION

The present invention relates to a near-infrared ray shielding film. More specifically, it relates to a near-infrared ray shielding film which consists of low refractive index layers and high refractive inex layers alternated with each other, selectively reflects light having a near-infrared wavelength range according to the difference of refractive index between layers and the thickness of each layer and substantially transmits visible radiation.

DESCRIPTION OF THE PRIOR ART

Laminated glass having the function of shielding a heat ray has been studied as glass for use in the windows of vehicles such as automobiles and trains and the windows of buildings, and some products have already been implemented. Since the laminated glass prevents the input of the heat ray, it is now attracting attention from the viewpoint of energy saving.

The laminated glass transmits a visible ray out of all the rays and selectively reflects or absorbs the heat ray. When it is used as window glass, for example, it can suppress a rise in the inside temperature of a room caused by the input of the heat ray when sunlight is strong and the escape of heat to the outside from the inside when sunlight is weak and a heater is used. Therefore, the use efficiency of energy can be greatly improved by using this laminated glass, thereby contributing to energy saving.

This laminated glass can be obtained by forming a heat ray shielding film on glass. JP-A 4-295804 discloses a reflective polymer material which comprises a first polymer layer having an optical thickness of 0.09 to 0.45 μm and a second polymer layer having an optical thickness of 0.09 μm or less, or 0.45 μm or more with a difference in refractive index between the polymers of the both layers of at least 0.03. As a combination of the first polymer layer and the second polymer layer, the above publication discloses a combination of a polycarbonate and a blend of vinylidene polyfluoride and polymethyl methacrylate, a combination of a polystyrene and a copolymer of ethylene and an unsaturated monocarboxylic acid, a combination of a polystyrene and polymethyl methacrylate, and a combination of a polycarbonate and polymethyl methacrylate.

JP-A 4-313704 discloses an optical interference film which consists of at least three different alternate layers having an optical thickness of 0.09 to 0.45 μm, the refractive index of the polymer of the second layer being between the refractive index of the polymer of the first layer and the refractive index of the polymer of the third layer, and which reflects infrared radiation and transmits visible radiation. As a combination of three layers, the above publication discloses a combination of a polystyrene (first layer), a copolymer of styrene and methyl methacrylate (second layer) and polymethyl methacrylate (third layer). It also teaches that one layer out of the three layers may be made of polyethylene-2,6-naphthalate.

JP-A 5-193040 discloses a reflective polymer object consisting of first polymer layers and second polymer layers alternated with each other most of which have an optical thickness of 0.09 μm or less, or 0.45 μm or more substantially, and at least one of which has an optical thickness of 0.45 μm or more, with a difference in refractive index between the polymers of the both layers of at least 0.1. Examples of the polymers of the both layers include a copolycarbonate of bisphenol A and 4,4'-thiodiphenol and a blend of polymethyl methacrylate and vinylidene polyfluoride.

The pamphlet of WO95/1703 discloses a multi-layer film consisting of crystalline naphthalene dicarboxylic acid polyester layers and polymer layers having a lower refractive index than that of the naphthalene dicarboxylic acid polyester layers and alternated with the layers.

The pamphlet of WO97/01778 discloses a transparent multi-layer device which comprises a multi-layer polymer film and a transparent conductor having at least one layer containing a metal or metal compound, reflects infrared radiation and transmits visible radiation.

JP-A 2003-320632 discloses a biaxially oriented multi-layer film composed of 11 or more alternate layers which consist of first layers and second layers, both made of a polyester comprising ethylene terephthalate as the main recurring unit and having a thickness of 0.05 to 0.5 μm.

JP-A 2004-74764 discloses a biaxially oriented multi-layer film composed of 11 or more alternate layers which consist of first layers and second layers, both made of a polyester comprising ethylene-2,6-naphthalene dicarboxylate as the main recurring unit and having a thickness of 0.05 to 0.5 μm.

However, in the above heat ray shielding films, it is necessary to use resins which greatly differ in composition in combination in order to increase the difference of refractive index between layers. When these resins are used in combination, an interlayer separation phenomenon tends to occur due to low adhesion between layers. When this interlayer separation phenomenon occurs, burrs are generated at end portions of laminated glass in the step of forming a film on glass, or the obtained laminated glass wrinkles or glares. In the prior art, a wide near-infrared range cannot be shielded at a high level.

SUMMARY OF THE INVENTION

It is an object of the present invention to provide a near-infrared ray shielding film which has high adhesion between layers, is substantially transparent, can shield a wide near-infrared range at a high level and is free from electromagnetic interference.

It is another object of the present invention to provide a laminated glass comprising the near-infrared ray shielding film of the present invention.

Other objects and advantages of the present invention will become apparent from the following description.

According to the present invention, firstly, the above objects and advantages of the present invention are attained by a near-infrared ray shielding film comprising:

a first laminated film portion consisting of at least 101 alternate layers: (1) 0.1 to 0.2 μm-thick first layers made of a first aromatic polyester having a melting point of 250 to 260° C. and comprising ethylene terephthalate as the main recurring unit and (2) 0.09 to 0.22 μm-thick second layers made of a second aromatic polyester having a melting point of 200 to 245° C. and comprising ethylene terephthalate as the main recurring unit, wherein the melting point of the second aromatic polyester is 15 to 60° C. lower than the melting point of the first aromatic polyester, combinations of the adjacent first layer and second layer whose thickness is 0.9 to 1.1 times the thickness of the first layers account for 70% or more of the total; and a second laminated film portion which is identical to the first laminated film portion except that the average thickness of the first layers and the second layers of the second laminated film portion is 1.05 to 1.6 times the average thickness of the first layers and the second layers of the first laminated film portion.

According to the present invention, secondly, the above objects and advantages of the present invention are attained by a laminated glass comprising the near-infrared ray shielding film of the present invention sandwiched between two glass plates through polyvinyl butyral sheets.

DETAILED DESCRIPTION OF THE PREFERRED EMBODIMENT

The present invention will be described in detail hereinunder.

The near-infrared ray shielding film of the present invention is a multi-layer laminated film having a first laminated film portion and a second laminated film portion as described above. It should be understood that the first laminated film of the first laminated film portion and the second laminated film of the second laminated film portion are identical to each other except that the average thickness of all the layers (first layers and second layers) constituting the second laminated film is 1.05 to 1.6 times the average thickness of all the layers (first layers and second layers) constituting the first laminated film.

Therefore, it should be understood that the following description is common to the first laminated film of the first laminated film portion and the second laminated film of the second laminated film portion unless stated otherwise.

The near-infrared shielding film according to the present invention preferably has first layers of the first laminated film portion and the first layers of the second laminated film portion which are biaxially oriented and second layers of these portions are substantially unoriented.

These laminated films consist of first layers and second layers which are alternated with each other.

First Layers

The first layers of the laminated film of the present invention are made of a first aromatic polyester having a melting point of 250 to 260° C. When the melting point of the first aromatic polyester is lower than 250° C., the difference of melting point between the first aromatic polyester and the second aromatic polyester of the second layers becomes small, thereby making it difficult to provide a sufficiently large refractive index difference to the obtained multi-layer laminated film. Polyethylene terephthalate is preferably used as the first aromatic polyester. Polyethylene terephthalate generally has a melting point of 256° C. when it does not contain a comonomer.

In the present invention, the first aromatic polyester is a polyester comprising an ethylene terephthalate component as the main recurring unit. It is preferably a homopolyethylene terephthalate or a copolyethylene terephthalate comprising an ethylene terephthalate component in an amount of 95 mol % or more of the total of all the recurring units as it can maintain a higher melting point than that of the second aromatic polyester which will be described hereinafter. When the amount of the ethylene terephthalate component is smaller than 95 mol %, the melting point lowers and a difference in melting point between the first aromatic polyester and the second aromatic polyester is hardly obtained with the result that a sufficiently large refractive index difference is hardly provided to a stretched laminated film. Out of these, the homopolyethylene terephthalate is preferred because it can maintain a high melting point. When the polyester contains a comonomer, the comonomer is selected from other aromatic carboxylic acids such as isophthalic acid, 2,6-naphthalenedicarboxylic acid and 2,7-naphthalenedicarboxylic acid; aliphatic dicarboxylic acids such as adipic acid, azelaic acid, sebacic acid and decanedicarboxylic acid; dicarboxylic acid component exemplified by alicyclic dicarboxylic acids such as cyclohexanedicarboxylic acid; aliphatic diols such as butanediol and hexanediol; and diol component exemplified by alicyclic diols such as cyclohexanedimethanol.

The thickness of the first layers must be 0.1 to 0.2 μm in order to obtain the effect of reflecting near-infrared radiation selectively by optical interference between layers. By setting the thickness of the layers to this range, near-infrared radiation can be selectively reflected and shielded. When the thickness of the first layers is smaller than 0.1 μm, reflected radiation becomes visible radiation and the film is colored, thereby reducing visibility. When the thickness is larger than 0.2 μm, a tertiary peak (⅓ of the main reflection peak) is generated by optical interference between layers at a visible range with the result that the film is colored, thereby impairing transparency.

Second Layers

The second layers are made of a second aromatic polyester having a melting point of 200 to 245° C. The melting point of the second aromatic polyester is 15 to 60° C. lower than the melting point of the first aromatic polyester. When this melting point exceeds this range, the difference of melting point between the first aromatic polyester and the second aromatic polyester becomes small, thereby making it difficult to provide a sufficiently large refractive index difference to the obtained stretched laminated film. When the melting point of the second aromatic polyester falls below the above range, a polyester which greatly differs from the first aromatic polyester in structure is used inevitably with the result of insufficient adhesion between the first layers and the second layers.

In the present invention, the second aromatic polyester is a polyester comprising an ethylene terephthalate component as the main recurring unit. It is preferably a crystalline polyester from the viewpoint of film formability by biaxial orientation. It is more preferably a copolyethylene terephthalate comprising an ethylene terephthalate component in an amount of 75 to 97 mol % of the total of all the recurring units and other comonomer in an amount of 3 to 25 mol % as its melting point can be made lower than that of the first aromatic polyester. When the amount of the ethylene terephthalate component is smaller than 75 mol % of the total of all the recurring units or the amount of the comonomer is larger than 25 mol %, the polymer shows substantially noncrystallinity, film formability by biaxial orientation degrades, and further the second aromatic polyester greatly differs from the first aromatic polyester in structure of polymer, thereby reducing adhesion between layers. When the amount of the ethylene terephthalate component is larger than 97 mol % of the total of all the recurring units and the amount of the comonomer is smaller than 3 mol %, the difference of melting point between the first aromatic polyester and the second aromatic polyester becomes small, thereby making it difficult to provide a sufficiently large reflectance to the stretched laminated film.

Examples of the comonomer include aromatic carboxylic acids such as isophthalic acid, 2,6-naphthalenedicarboxylic acid and 2,7-naphthalenedicarboxylic acid; aliphatic dicarboxylic acids such as adipic acid, azelaic acid, sebacic acid and decanedicarboxylic acid; dicarboxylic acid component exemplified by alicyclic dicarboxylic acids such as cyclohexanedicarboxylic acid; aliphatic diols such as butanediol and hexanediol; and diol component exemplified by alicyclic diols such as cyclohexanedimethanol. Out of these, 2,6-naphthalenedicarboxylic acid and isophthalic acid are preferred because their melting points are easily reduced while stretching properties are maintained as compared with the other components.

The thickness of the second layers must be 0.09 to 0.22 µm, preferably 0.1 to 0.2 µm in order to obtain the effect of selectively reflecting near-infrared radiation by optical interference between layers. By setting the thickness of the layers to this range, near-infrared radiation can be selectively reflected and shielded. When the thickness of the first layers is smaller than 0.09 µm, reflected radiation becomes visible radiation and the film is colored, thereby reducing visibility. When the thickness is larger than 0.22 µm, a tertiary peak is generated by optical interference between layers at a visible range with the result that the film is colored, thereby impairing transparency.

The thickness of the second layers must be 0.9 to 1.1 times the thickness of the first layers. This means that the thickness of the second layers adjacent to the first layers is 0.9 to 1.1 when the thickness of the first layers is 1. This relationship must be established in most of the layers of the laminated film, that is, 70% or more, preferably 80% or more, more preferably 90% or more, particularly preferably 95% or more of the total of all the layers of the laminated film.

As disclosed in "Reflectivity of Iridescent Coextruded Multilayered Plastic Films" of Radford et al. and Polymer Engineering and Science, vol. 13, No. 3, May 1973, one of the problems of a quarter wavelength multi-layer interference film is that it shows a visible color without appropriate correction for removing reflection of higher order. When the ratio of the optical thickness of the layer B to the optical thickness of the layer A for the main reflection peak of the multi-layer interference film is 1.0, secondary (½ wavelength of the main reflection peak) and quaternary (¼ wavelength of the main reflection peak) peaks out of peaks of higher order can be removed. Therefore, in the near-infrared ray shielding film of the present invention, in consideration of the refractive indices of the layers of the laminated film, the thickness of the second layers must be set such that the ratio of the thickness of the second layers to the thickness of the adjacent first layers becomes 0.9 to 1.1. When the thickness ratio is smaller than 0.9 or larger than 1.1, a secondary peak corresponding to the ½ wavelength of the reflection peak is generated at a visible range, whereby the film is colored, impairing transparency.

Laminated Film

The laminated film in the present invention comprises 101 or more alternate layers which consist of the above first layers and second layers. The upper limit of the total number of layers may be 1,001 or 10,001 layers but preferably no more than 501 layers from the viewpoint of productivity. That is, the total number of layers of the multi-layer laminated film is 101 or more, preferably 101 to 501. When the total number of layers is smaller than 101, selective reflection by multiple interference becomes low and a sufficiently high reflectance is not obtained.

This laminated film is preferably biaxially oriented to provide sufficiently high mechanical strength.

Since the laminated film in the present invention reflects light having a specific wavelength efficiently and selectively, the thickness distribution of each layer is preferably uniform. To this end, it is preferred that the thickness of each of the first layers should be uniform and that the thickness of each of the second layers should be uniform. Each of the first layers may differ from each of the second layers in thickness.

The laminated film in the present invention has a thickness variation width represented by the following expression of preferably less than 10%, more preferably less than 5%, particularly preferably less than 3%. When the thickness variation width of the film is 10% or more, the wavelength of near-infrared radiation to be reflected changes, whereby performance becomes unstable.

$$\text{Thickness variation width} = ((T_{max} - T_{min})/T_{ave}) \times 100$$

wherein $T_{ave}$ is the average thickness, $T_{max}$ is the maximum thickness, and $T_{min}$ is the minimum thickness.

Near-infrared Ray Shielding Film

The near-infrared ray shielding film of the present invention is a multi-layer laminated film consisting of at least two, preferably three or more, more preferably 4 or more of the above laminated films.

In the near-infrared ray shielding film of the present invention, the average thickness of the first layers and the second layers of one laminated film must be 1.05 to 1.6 times the average thickness of the first layers and the second layers of other laminated film in order to shield a wide near-infrared band. When the average thickness is less than 1.05 times, an extremely large number of multi-layer laminated films must be joined together to shield a wide near-infrared range as the space between reflection peaks at a near-infrared range is narrow. When several to twelve or thirteen laminated films are joined together, satisfactory near-infrared shielding properties cannot be obtained. When the average thickness is more than 1.6 times, a peak is generated at a visible range and the film is colored.

The near-infrared ray shielding film of the present invention consists of at least two laminated films which are joined together by the following methods: (i) an adhesive layer is formed on one laminated film to join the laminated film to other laminated film, (ii) a heat sealing layer is formed on the outermost layer of the laminated film and other laminated film is joined to the laminated film by heat, and (iii) two melt molded laminated films are joined together while they are still molten. When three or more laminated films are joined together to obtain the near-infrared ray shielding film of the present invention, in the case of three laminated films which consist of a first laminated film, a second laminated film and a third laminated film, preferably, the average thickness of the first layers and the second layers of the first laminated film is 1.05 to 1.6 times the average thickness of the first layers and the second layers of the second laminated film, and the average thickness of the first layers and the second layers of the second laminated film is 1.05 to 1.6 times the average thickness of the first layers and the second layers of the third laminated film. The second laminated film and the third laminated film may be interchanged.

The adhesive is preferably an acrylic or silicone adhesive, particularly preferably an acrylic adhesive when cost and a case where a protective film must be removed are taken into account. The adhesive may contain a stabilizer, ultraviolet light absorber, flame retardant and antistatic agent as additives. To suppress deterioration by ultraviolet radiation, the addition of an ultraviolet light absorber is effective. The thickness of the adhesive layer is preferably 10 to 15 µm.

Physical Properties of Near-infrared Ray Shielding Film

Reflectance Curve

The near-infrared ray shielding film of the present invention has an average reflectance for light having a wavelength of 800 to 1,100 nm of preferably 50% or more, more preferably 60% or more so as to be advantageously used as a heat ray reflective film for the windows of buildings and automobiles and a near-infrared ray shield film for plasma displays.

Visible Light Transmittance

The near-infrared ray shielding film of the present invention has a visible light transmittance specified in JIS-R3106 of preferably 80% or more, more preferably 85% or more so as to obtain high visibility and high transparency when used in the window of a building or automobile.

Sunlight Transmittance

The near-infrared ray shielding film of the present invention has a sunlight transmittance specified in JIS-R3106 of preferably 75% or less, more preferably 70% or less so as to obtain high near-infrared ray shielding properties when used in the window of a building or automobile.

Haze

The near-infrared ray shielding film of the present invention has a haze of preferably 1.5% or less, more preferably 1.0% or less, particularly preferably 0.5% or less so as to obtain high visibility.

Heat Shrinkage Factor

Preferably, the near-infrared ray shielding film of the present invention has a shrinkage factor of 2% or less in the film forming direction and the transverse direction of the film when it is heated at 150° C. for 30 minutes so as to prevent separation between the film and glass and cracking after it is joined to glass and a shrinkage factor difference of 0.5% or less in the film forming direction and the transverse direction when it is heated at 150° C. for 30 minutes so as to prevent wrinkling by the deformation of the film after it is joined to glass.

DSC Peak

In the near-infrared ray shielding film of the present invention, preferably, the first layers and the second layers are both made of a polyester having crystallinity and the orientation of the polyester of the second layers is cancelled at least partially after stretching and heat setting so as to obtain high adhesion between layers and ensure film formability by biaxial orientation. In the present invention, the orientation of the second layers alone is eased by canceling the crystallization of the second layers at least partially, while the in-plane refractive index of the first layers is kept high by orienting the first layers by stretching, in order to reduce the in-plane refractive index of the second layers, thereby obtaining a refractive index difference between the layers.

In general, this near-infrared ray shielding film has at least two melting points measured by DSC (differential scanning calorimeter, temperature elevation rate of 20° C./min) both of which differ from each by 15° C. or more. As for the measured melting points, a higher melting point is for the first layers showing a high refractive index and a lower melting point is for the second layers showing a low refractive index.

Since the second layers after stretching and heat setting are molten to cancel crystallization at least partially, the crystallization peak measured by DSC is preferably existent at 100 to 190° C. When the crystallization peak is existent at 100° C. or lower, the first layers or the second layers quickly crystallize at the time of stretching the film, whereby the film forming properties are apt to deteriorate, and the homogeneity of the film is apt to degrade with the result that the film is not uniform in color disadvantageously. When the crystallization peak is existent at 190° C. or higher, crystallization occurs simultaneous with the melting of the second layers by heat setting and it is difficult to obtain a sufficiently large refractive index difference disadvantageously.

As for the near-infrared ray shielding film of the present invention, a homogeneous film is obtained by stretching the polyester of the first layers and the polyester of the second layers both of which show crystallinity, and adhesion between layers and reflectance can be improved by melting the polyester of the second layers after stretching.

Therefore, the near-infrared ray shielding film of the present invention is preferably a biaxially oriented near-infrared ray shielding film which has a crystallization peak measured by DSC at 100 to 190° C. and two or more melting peaks different from each other by 15° C. or more.

Break Strength

The near-infrared ray shielding film of the present invention has a break strength in the stretching directions of preferably 50 MPa or more, more preferably 80 MPa or more, particularly preferably 100 MPa or more. When the break strength is lower than 50 MPa, the handling ease of the multi-layer laminated film at the time of processing deteriorates and the durability of the obtained product lowers disadvantageously. When the break strength is higher than 50 MPa, the stiffness of the film becomes high and the winding properties improve. The strength ratio of the two stretching directions, that is, the longitudinal direction and the transverse direction is preferably 3 or less, more preferably 2 or less so as to provide sufficiently high tear resistance. The upper limit of break strength is not particularly limited but generally no more than 500 MPa so as to maintain the stability of the stretching step.

Lubricant

Preferably, the near-infrared ray shielding film of the present invention does not contain inert particles so as to maintain high transparency. However, the film is allowed to contain inert fine particles so as to prevent a fine scratch in the manufacturing process and improve the winding properties of the film. In this case, the inert fine particles may be contained in the first layers, the second layers or both of them. It is recommended to use inert fine particles having an average particle diameter of 0.01 to 2 μm, preferably 0.05 to 1 μm, particularly preferably 0.1 to 0.3 μm. They can be used in an amount of 0.001 to 0.01 wt % based on the weight of the laminated film.

When the inert particles are contained, if the average particle diameter of the inert particles is smaller than the lower limit or the content thereof is lower than the lower limit, the effect of improving the winding properties of the multi-layer laminated film may become unsatisfactory. If the content of the inert particles exceeds the upper limit or the average particle diameter exceeds the upper limit, the deterioration of the optical properties of the multi-layer laminated film by the particles will become marked.

Examples of the inert particles include inorganic inert particles such as silica, alumina, calcium carbonate, calcium phosphate, kaolin and talc, and organic inert particles such as silicone, crosslinked polystyrene and styrene-divinylbenzene copolymer.

These inert particles are preferably spherical particles having a long-diameter/short-diameter ratio of 1.2 or less, preferably 1.1 or less (may be referred to as "spherical particles" hereinafter) so as to maintain the slipperiness and optical properties of the film as much as possible. The inert particles preferably have a sharp particle size distribution, for example, a relative standard deviation of preferably less than 0.3, more preferably less than 0.2. When particles having a large relative standard deviation are used, the frequency of coarse particles becomes high and an optical defect may be produced. The average particle diameter, particle diameter ratio and relative standard deviation of the inert particles are calculated by sputtering a metal for providing conductivity thin over the surface of each particle, obtaining the long diameter, short diameter and area circle equivalent diameter from an image enlarged to 10,000 to 30,000 times by an electron microscope and inserting these into the following expressions. Average particle diameter=total of area circle equivalent diameters of measured particles/number of measured particles Particle diameter ratio=average long diameter of particles/average short diameter of particles Manufacturing Process The laminated film in the present invention has a sufficiently large refractive index difference on the plane between the first layers and the second layers. The refractive index difference in the present invention results from a difference in the degree of orientation between polymers constituting these layers and not a refractive index difference between the resins.

In the present invention, a refractive index difference is created between layers not by a difference in refractive index between the resins but a difference in the degree of orientation so as to provide near-infrared shielding properties. To provide a sufficiently large refractive index difference between the first layers and the second layers constituting the laminated film, for example, the unstretched laminated film is stretched and then heat set at a temperature close to the melting point of the second layers. This heat setting is carried out in order to return the polyester having a lower melting point which has been oriented and crystallized by stretching to a non-crystalline state. This temperature will be described hereinafter.

The laminated film in the present invention can be manufactured by the following process, for example.

The laminated film in the present invention is manufactured by melting the polyester for the first layers and the polyester for the second layers separately and extruding these molten polyesters to form at least 101 alternate layers so as to obtain a multi-layer unstretched film. This multi-layer unstretched film is stretched biaxially in the film forming direction and the transverse direction perpendicular to that direction (directions parallel to the film plane). The stretching temperature is preferably the temperature of the glass transition point of the polyester of the first layers (Tg) to (Tg+50)° C. The area draw ratio is preferably 5 to 50 times. As the draw ratio becomes larger, the first layers and the second layers become less non-uniform in the plane direction and the optical inference of the multi-layer stretched film becomes more uniform in the plane direction. Stretching may be sequential biaxial stretching, simultaneous biaxial stretching or a combination thereof.

Thereafter, this multi-layer stretched film is heat set at a temperature range from a temperature 10° C. lower than the melting point of the polyester of the second layers to a temperature 15° C. lower than the melting point of the polyester of the first layers. This heat setting eases the orientation of the molecular chain of the polyester of the second layers and reduces the refractive index of the second layers to make the refractive index of the first layers different from that of the second layers. When the heat setting temperature is more than 10° C. lower than the melting point of the polyester of the second layers, the effect of easing the orientation of the molecular chain in the second layers to reduce the refractive index of the second layers becomes unsatisfactory, thereby making it impossible to provide a sufficiently large refractive index difference to the obtained multi-layer stretched film. When the heat setting temperature is not more than 10° C. lower than the melting point of the polyester of the first layers, the orientation of the molecular chain in the first layers is also eased to reduce the refractive index of the first layers, thereby making it impossible to provide a sufficiently large refractive index difference to the obtained multi-layer stretched film.

The heat setting temperature is preferably from a temperature 60° C. lower than the melting point of the polyester of the second layers to a temperature 16° C. lower than the melting point of the polyester of the first layers, more preferably from a temperature 2° C. lower than the melting point of the polyester of the second layers to a temperature 18° C. lower than the melting point of the polyester of the first layers. The heat setting time is preferably 1 to 60 seconds.

By changing the heat setting temperature and time, the difference of refractive index between the first layers and the second layers can be made sufficiently large while adhesion between layers is ensured by using polyesters having similar properties in the first layers and the second layers.

The thus obtained laminated films are joined together by the above methods (i) and (ii) to obtain the near-infrared ray shielding film of the present invention. In the case of the method (iii), the obtained laminated film is stretched to obtain the near-infrared ray shielding film of the present invention.

Laminated Glass

The laminated glass of the present invention can be manufactured by sandwiching the near-infrared ray shielding film of the present invention between two glass plates through polyvinyl butyral sheets by a method known per se for manufacturing a laminated glass having a polyvinyl butyral resin layer between two glass plates.

EXAMPLES

The following examples are provided to further illustrate the present invention. Physical properties and characteristic properties in Examples are measured or evaluated by the following methods.

(1) Melting Point and Glass Transition Point (Tg) of Polyester 10 mg of a polyester sample was collected to measure its melting point by DSC (trade name: DSC2920 of TA Instruments Co., Ltd.) at a temperature elevation rate of 20° C./min.

(2) Thickness of Each Layer

The film sample was cut into a triangle, and the triangle was fixed in a capsule and buried in an epoxy resin. The buried sample was cut with a microtome (ULTRACUT-S of Raihelt Co., Ltd.) in the film forming direction and the thickness direction to obtain a 50 nm-thick piece. The obtained thin film piece was observed and photomicrographed by a transmission electron microscope (trade name: JEM2010 of JEOL Ltd.) at an acceleration voltage of 100 kV to measure the thickness of each layer from its photomicrograph.

(3) Measurement of Melting Point and Crystallization Peak by DSC of Film 10 mg of the film sample was measured for crystallization temperature and melting point by DSC (trade name: DSC2920) of TA Instruments Co., Ltd. at a temperature elevation rate of 20° C./min.

(4) Reflectance and Reflection Wavelength

The relative mirror reflectance from an aluminum deposited mirror of the film sample was measured at a wavelength from 700 nm to 1,300 nm by using a spectrophotometer (MPC-3100 of Shimadzu Corporation). The maximum one of the measured reflectances is taken as maximum reflectance and its wavelength is taken as reflection wavelength.

(5) Visible Light Transmittance, Sunlight Transmittance

The relative spectral transmittance based on a barium sulfate integrating sphere of the film sample was measured at a wavelength from 300 nm to 2,100 nm by using a spectrophotometer (MPC-3100 of Shimadzu Corporation). The visible light transmittance and the sunlight transmittance were calculated from the obtained transmittance curve in accordance with JIS R 3106:1998.

(6) Average Reflectance

The relative mirror reflectance from an aluminum deposited mirror of the film sample was measured at a wavelength from 800 nm to 1,100 nm by using a spectrophotometer (MPC-3100 of Shimadzu Corporation). The average reflectance of light having a wavelength from 800 nm to 1,100 nm was calculated from the measured reflectance curve.

(7) Total Light Transmittance and Haze

The total light transmittance $T_t(\%)$ and the scattered light transmittance $T_d(\%)$ of the film sample were measured by using a haze meter (NDH-20 of Nippon Denshoku Kogyo Co., Ltd.) in accordance with JIS K 7361-1:1997 so as to calculate haze (%) from the following equation.

Haze (%)=$(T_d/T_t)\times 100$ (8) Break Strength

The break strength in the film forming direction of a film sample having a width (transverse direction) of 10 mm and a length (film forming direction) of 150 mm was measured from a load-elongation curve obtained by pulling the film sample at a chuck interval of 100 mm, a pulling rate of 100 mm/min and a chart rate of 500 m/min by an Instron type universal tensile tester.

The break strength in the transverse direction was measured in the same manner as the break strength in the film forming direction except that a film sample having a width (film forming direction) of 10 mm and a length (transverse direction) of 150 mm was used.

(9) Heat Shrinkage Factor, Heat Shrinkage Factor Difference

The heat shrinkage factor when the film sample was heated at 150° C. for 30 minutes was calculated from the following equation by holding the film sample under no tension in an oven set at 150° C. for 30 minutes so as to measure a dimensional change before and after heating.

Heat shrinkage factor %=$((L0-L)/L0)\times 100$

L0: distance between marks before heating

L: distance between marks after heating

The difference of heat shrinkage factor is a value obtained by subtracting a heat shrinkage factor in the transverse direction from a heat shrinkage factor in the film forming direction.

(10) Thickness Change Rate

A film sample measuring 1 m×1 m in the film forming direction and the transverse direction was cut into 25 squares measuring 2 cm×2 cm in the longitudinal direction and the transverse direction, and the thickness of each square was measured continuously by an electronic micrometer and a recorder (K-312A, K310B of Anritsu Corporation). The average thickness was calculated from all the measurement values, and the measurement values are further divided into groups for each interval of 200 mm to read the maximum value and the minimum value in each group so as to calculate a thickness change rate from the average thickness based on the following equation.

Thickness change rate=$((T_{max}-T_{min})/T_{ave})\times 100$ wherein $T_{max}$ is the maximum thickness and $T_{min}$ is the minimum thickness.

(11) Color Drift $L^*$, $a^*$ and $b^*$ in the $L^*a^*b^*$ color specification system were obtained from the transmission spectrum of the film sample for standard light C in accordance with JIS standard Z8729 to calculate ab chroma ($C^*ab$) from the following equation.

$C^*ab=((a^*)^2+(b^*)^2)^{1/2}$

The drift of chroma from achromatic color was evaluated from the obtained $C^*ab$ based on the following criteria.

◎: $C^*ab$ is less than 10

○: $C^*ab$ is 10 or more and less than 20

X: $C^*ab$ is 20 or more

(12) Adhesion Between Layers

A film sample (200 mm×200 mm) was cross cut at a cutter elevation angle of 30° and a weight of 200 g by a cross-cut tester to form twenty-five 5 mm squares and fixed, a 80 mm cloth tape was affixed to the squares and removed at a peel angle of 90°, and the number of squares where peeling between layers occurred in the twenty-five squares was counted to calculate the mean of three count values.

(13) Evaluation of Appearance of Laminated Glass

The appearances of laminated glasses measuring 500 mm×400 mm obtained in Examples and Comparative Examples were evaluated visually based on the following criteria.

When items (wrinkles, glare, air are burrs) were observed on the sample glass under illumination by a 30 W fluorescence lamp, the laminated glass was evaluated as "existence" and when they were not observed, the laminated glass was evaluated as "non-existence".

Reference Example 1

A polyethylene terephthalate (melting point: 258° C.) having an intrinsic viscosity (orthochlorophenol, 35° C.) of 0.62 was prepared as the polyester for the first layers, and a copolyethylene terephthalate (melting point: 223° C.) comprising 12 mol % of isophthalic acid and having an intrinsic viscosity (orthochlorophenol, 35° C.) of 0.65 was prepared as the polyester for the second layers.

The polyester for the first layers and the polyester for the second layers were dried at 170° C. for 3 hours and supplied into an extruder to be heated at 280° C. so as to be molten. 101 layers were formed from the polyester for the first layers, 100 layers were formed from the polyester for the second layers, these layers were placed one upon another alternately by using a multi-layer feed block device, introduced into a die while they were joined together and cast onto a casting drum to form an unstretched laminated film composed of 201 alternate layers consisting of the first layers and the second layers and having a thickness ratio of the first layers to the second layers of 0.95 to 1.00. The ratio of the polyester extrusion of the first layers to the extrusion of the second layers was adjusted to 0.95 to 1.00, and the surface layers were first layers. This unstretched film was stretched to 3.6 times in the film forming direction at 90° C. and to 3.9 times in the transverse direction at 95° C. and heat set at 230° C. for 3 seconds to form a laminated film.

The thickness of this laminated film was 26.0 μm, and the average thicknesses of the first layers and the second layers were 125 nm and 132 nm, respectively. The manufacturing conditions of the multi-layer laminated film are shown in Table 1 and its characteristic properties are shown in Table 2.

Reference Examples 2 to 4

Laminated films were manufactured in the same manner as in Reference Example 1 except that the thickness of the laminated film was changed to 27.5 μm, 29.0 μm and 30.5 μm. The average thicknesses of the first layers and the second layers of the laminated film are shown in Table 2. The manufacturing conditions of the multi-layer laminated films are shown in Table 1 and their characteristic properties are shown in Table 2.

TABLE 1

| | First Layers | | | Second layers | | | |
|---|---|---|---|---|---|---|---|
| | | Resin | | | Resin | | |
| | Resin | Melting point (° C.) | Number of layers | Resin | Melting point (° C.) | Number of layers | Total number of layers |
| Reference Example 1 | PET | 258 | 101 | IA12PET | 223 | 100 | 201 |
| Reference Example 2 | PET | 258 | 101 | IA12PET | 223 | 100 | 201 |
| Reference Example 3 | PET | 258 | 101 | IA12PET | 223 | 100 | 201 |
| Reference Example 4 | PET | 258 | 101 | IA12PET | 223 | 100 | 201 |

| | Stretching in film forming direction | | Stretching in transverse direction | | Heat setting | Film thickness |
|---|---|---|---|---|---|---|
| | Draw ratio | Temperature (° C.) | Draw ratio | Temperature (° C.) | Temperature (° C.) | (μm) |
| Reference Example 1 | 3.6 | 90 | 3.9 | 95 | 230 | 26.0 |
| Reference Example 2 | 3.6 | 90 | 3.9 | 95 | 230 | 27.5 |
| Reference Example 3 | 3.6 | 90 | 3.9 | 95 | 230 | 29.0 |
| Reference Example 4 | 3.6 | 90 | 3.9 | 95 | 230 | 30.5 |

PET in the table denotes polyethylene terephthalate and IA12PET is copolyethylene terephthalate comprising 12 mol % of isophthalic acid.

TABLE 2

| | Thickness | | | Crystallization peak [° C.] | DSC measurement results | | Break strength | |
|---|---|---|---|---|---|---|---|---|
| | | | | | Melting point on low temperature side [° C.] | Melting point on high temperature side [° C.] | Machine direction [MPa] | Transverse direction [MPa] |
| | Total [μm] | Layer A [nm] | Layer B [nm] | | | | | |
| R. Ex. 1 | 26.0 | 125 | 132 | 121 | 237 | 247 | 133 | 136 |
| R. Ex. 2 | 27.5 | 133 | 140 | 121 | 237 | 246 | 139 | 138 |
| R. Ex. 3 | 29.0 | 140 | 147 | 121 | 237 | 246 | 140 | 144 |
| R. Ex. 4 | 30.5 | 147 | 155 | 121 | 237 | 246 | 144 | 142 |

| | Shrinkage factor (150° C. × 30 minutes) | | | Optical properties | | | |
|---|---|---|---|---|---|---|---|
| | Machine direction [%] | Transverse direction [%] | Difference [%] | Maximum reflection wavelength [nm] | Height of reflection peak [%] | Total light transmittance [%] | Haze [%] |
| R. Ex. 1 | 1.1 | 0.9 | 0.2 | 846 | 72 | 90.7 | 0.3 |
| R. Ex. 2 | 1.1 | 0.9 | 0.2 | 895 | 73 | 90.6 | 0.3 |
| R. Ex. 3 | 1.1 | 0.8 | 0.3 | 944 | 73 | 90.5 | 0.3 |
| R. Ex. 4 | 1.1 | 0.9 | 0.2 | 993 | 72 | 89.9 | 0.3 |

| | Thickness change rate | | | Adhesion |
|---|---|---|---|---|
| | Machine direction [%] | Transverse direction [%] | Color drift [%] | between layers [%] |
| R. Ex. 1 | 2.5 | 2.1 | ◎ | 0/25 |
| R. Ex. 2 | 2.3 | 2.3 | ◎ | 0/25 |
| R. Ex. 3 | 3.1 | 3.3 | ◎ | 0/25 |
| R. Ex. 4 | 2.8 | 3.2 | ◎ | 0/25 |

R. Ex.: Reference Examples

Example 1

An adhesive for forming an adhesive layer (composition is shown in Table 4) was applied to one side of the laminated film obtained in Reference Example 1 by roll coating to a dry thickness of 15 μm so as to obtain a near-infrared ray shielding film having an adhesive layer. A 50 μm-thick polyethylene terephthalate film whose surface had been treated with silicone was joined to the adhesive layer of the near-infrared ray shielding film having an adhesive layer as a separator film. The obtained near-infrared ray shielding film having an adhesive layer and the laminated film obtained in Reference Example 3 were joined together by the adhesive layer to obtain a near-infrared ray shielding film. The physical properties of the obtained near-infrared ray shielding film are shown in Table 3.

TABLE 3

|  | Optical properties | | | Sunlight shielding properties | |
| --- | --- | --- | --- | --- | --- |
|  | Average reflectance [%] | Total light transmittance [%] | Haze [%] | Visible light transmittance [%] | Sunlight transmittance [%] |
| Example 1 | 53.3 | 88 | 1.0 | 87 | 74 |
| Example 2 | 74.7 | 86 | 1.3 | 85 | 65 |

TABLE 4

| Adhesive | Acrylic adhesive (trade name: SK Dyne 1425 (D-90) of Souken Kagaku Co., Ltd.) | 3,600 parts by weight |
| --- | --- | --- |
| Solvent | Ethyl acetate | 10,000 parts by weight |

Example 2

The multi-layer laminated films obtained in Reference Examples 1 to 4 were joined together by an acrylic adhesive as in Example 1 to obtain a near-infrared ray shielding film. The physical properties of the obtained near-infrared ray shielding film are shown in Table 3.

Example 3

The near-infrared ray shielding film obtained in Example 2 was sandwiched between two 0.38 mm-thick polyvinyl butyral sheets (PVB, trade name: Eslec Film of Sekisui Chemical Co., Ltd.) by a lamination device and further sandwiched between two glass plates having a thickness of 2 mm, a length of 500 mm (curvature of 150 R) and a width of 400 mm (curvature of 1500 R). The resulting laminate was placed in a heating pressure furnace to be heated at 130° C. and 13 atm for 30 minutes, the temperature was reduced to 40° C. while the pressure was maintained, the pressure was then returned to normal level, the laminate was taken out from the furnace, and a portion projecting from the glass plates of the film was cut away to obtain a laminated glass. When the appearance (existence of wrinkles, the inclusion of air, glare and burrs) of the obtained laminated glass was evaluated, it had none of these defects. Thus, a laminated glass having a good appearance was obtained.

Reference Example 5

A polyethylene terephthalate (PET) having an intrinsic viscosity (orthochlorophenol, 35° C.) of 0.62 was prepared as the polyester for the first layers, a copolyethylene terephthalate having an intrinsic viscosity (orthochlorophenol, 35° C.) of 0.65 and comprising 12 mol % of isophthalic acid was prepared as the polyester for the second layers, and a copolyethylene terephthalate having an intrinsic viscosity (orthochlorophenol, 35° C.) of 0.65 and comprising 12 mol % of isophthalic acid was prepared as the polyester for the outermost heat sealing layers. The polyester for the first layers and the polyester for the second layers were dried at 170° C. for 3 hours, the polyester for the heat sealing layers was dried at 150° C. for 3 hours, they were supplied into an extruder to be heated at 280° C. so as to be molten, 101 first layers were formed from the polyester for the first layers, 100 second layers were formed from the polyester for the second layers, these layers were joined together alternately by using a multi-layer feed block device, a heat sealing layer made of the polyester for the heat sealing layers was formed on both sides of the resulting laminate while its lamination state was maintained, and the resulting laminate was introduced into a die and cast onto a casting drum to form a unstretched multi-layer laminated film consisting of 203 layers and having a thickness ratio of the first layers to the second layers of 0.95:1.00 and a thickness ratio of the total thickness of the 201 layers to the total thickness of the heat sealing layers as the surface layers of 1:0.15. At this point, the ratio of the extrusion of the first layers to the extrusion of the second layers was adjusted to 0.95:1.00, and the extrusion of the heat sealing layer was adjusted to 30% of the total of the extrusions of the first layers and the second layers. The surface layers of the laminate were the heat sealing layers. This multi-layer unstretched film was then stretched to 3.6 times in the film forming direction at 90° C. and to 3.9 times in the transverse direction at 95° C., and heat set at 230° C. for 3 seconds.

The physical properties of the obtained biaxially oriented near-infrared ray shielding film are shown in Table 6.

Reference Examples 6 to 8

The procedure of Reference Example 5 was repeated except that the manufacturing conditions were changed as shown in Table 5.

The physical properties of the obtained biaxially oriented near-infrared ray shielding films are shown in Table 6.

TABLE 5

| | First layers | | | Second layers | | | Heat sealing layers | | |
|---|---|---|---|---|---|---|---|---|---|
| | | Resin | | | Resin | | | Resin | |
| | Resin | Melting point (° C.) | Number of layers | Resin | Melting point (° C.) | Number of layers | Resin | Melting point (° C.) | Number of layers |
| Reference Example 5 | PET | 258 | 101 | IA12PET | 223 | 100 | IA18PET | 223 | 2 |
| Reference Example 6 | PET | 258 | 101 | IA12PET | 223 | 100 | IA18PET | 223 | 2 |
| Reference Example 7 | PET | 258 | 101 | IA12PET | 223 | 100 | IA18PET | 223 | 2 |
| Reference Example 8 | PET | 258 | 101 | IA12PET | 223 | 100 | IA18PET | 223 | 2 |

| | Total number of layers | Stretching in film forming direction | | Stretching in transverse direction | | Heat setting |
|---|---|---|---|---|---|---|
| | | Draw ratio | Temperature (° C.) | Draw ratio | Temperature (° C.) | Temperature (° C.) |
| Reference Example 5 | 203 | 3.6 | 90 | 3.9 | 95 | 230 |
| Reference Example 6 | 203 | 3.6 | 90 | 3.9 | 95 | 230 |
| Reference Example 7 | 203 | 3.6 | 90 | 3.9 | 95 | 230 |
| Reference Example 8 | 203 | 3.6 | 90 | 3.9 | 95 | 230 |

TABLE 6

| | Thickness | | | | DSC measurement results | | | |
|---|---|---|---|---|---|---|---|---|
| | Total [μm] | layer A [nm] | layer B [nm] | Heat sealing layer [μm] | Crystallization peak [° C.] | Melting point 1 on low temperature side [° C.] | Melting point 2 on low temperature side [° C.] | Melting point on high temperature side [° C.] |
| R. Ex. 5 | 34.0 | 125 | 132 | 4.0 | 119 | 198 | 235 | 245 |
| R. Ex. 6 | 36.0 | 133 | 140 | 4.2 | 119 | 198 | 235 | 245 |
| R. Ex. 7 | 38.0 | 140 | 147 | 4.5 | 119 | 198 | 235 | 245 |
| R. Ex. 8 | 41.0 | 147 | 155 | 5.2 | 119 | 198 | 235 | 245 |

| | Break strength | | Shrinkage factor (30 minutes at 150° C.) | | |
|---|---|---|---|---|---|
| | Machine direction [MPa] | Transverse direction [MPa] | Machine direction [%] | Transverse direction [%] | Difference [%] |
| R. Ex. 5 | 123 | 130 | 1.2 | 1.0 | 0.2 |
| R. Ex. 6 | 125 | 131 | 1.2 | 1.0 | 0.2 |
| R. Ex. 7 | 124 | 133 | 1.2 | 1.0 | 0.3 |
| R. Ex. 8 | 120 | 130 | 1.2 | 1.0 | 0.2 |

| | Optical properties | | | | Thickness change rate | | | |
|---|---|---|---|---|---|---|---|---|
| | Maximum reflection wavelength [nm] | Height of reflection peak [%] | Total light transmittance [%] | Haze [%] | Machine direction [%] | Transverse direction [%] | Color drift | Adhesion between layers |
| R. Ex. 5 | 843 | 70 | 91.1 | 0.4 | 2.3 | 2.0 | ◎ | 0/25 |
| R. Ex. 6 | 890 | 71 | 90.9 | 0.4 | 2.6 | 2.1 | ◎ | 0/25 |
| R. Ex. 7 | 942 | 71 | 90.9 | 0.4 | 3.1 | 2.9 | ◎ | 0/25 |
| R. Ex. 8 | 999 | 70 | 89.9 | 0.4 | 2.2 | 3.5 | ◎ | 0/25 |

R. Ex.: Reference Examplle

Example 4

The biaxially oriented near-infrared ray shielding films obtained in Reference Examples 5 to 8 were joined together by using a heating lamination device (Lamipacker LPD280 of Fujipla Co., Ltd.) at a roll temperature of 170° C. to obtain a biaxially oriented near-infrared ray shielding laminated film. The physical properties of the obtained biaxially oriented near-infrared ray shielding film are shown in Table 7.

Example 5

A polyethylene terephthalate (PET) having an intrinsic viscosity (orthochlorophenol, 35° C.) of 0.62 was prepared as the polyester for the first layers, and a copolyethylene terephthalate having an intrinsic viscosity (orthochlorophenol, 35° C.) of 0.65 and comprising 12 mol % of isophthalic acid was prepared as the polyester for the second layers. The polyester for the first layers and the polyester for the second layers were dried at 170° C. for 3 hours and supplied into an extruder to be heated at 280° C. so as to be molten, 101 first layers were formed from the polyester for the first layers, 100 second layers were formed from the polyester for the second layers, these layers were joined together alternately by using a multi-layer feed block device to obtain a laminate consisting of 201 layers, and this laminate was divided into four pieces in an area ratio of 1.00:1.06:1.12:1.17 in a direction perpendicular to the lamination plane by using an interface forming device as shown in JP-A 4-278324, these pieces were joined together in a direction parallel to the lamination plane to obtain a laminate consisting of 801 layers, and this laminate was introduced into a die and cast onto a casting drum while its lamination state was maintained to form an unstretched multi-layer laminated film consisting of 201 first and second alternate layers and having a thickness ratio of the first layers to the second layers of 0.95:1.00. At this point, the ratio of the extrusion of the first layers to the extrusion of the second layers was adjusted to 0.95:1.00, and the surface layers of the laminate were first layers.

This multi-layer unstretched film was stretched to 3.6 times in the film forming direction at 90° C. and to 3.9 times in the transverse direction at 95° C., and heat set at 230° C. for 3 seconds.

The physical properties of the obtained biaxially oriented near-infrared ray shielding film are shown in Table 7.

TABLE 7

| | Optical properties | | Sunlight shielding performance | |
|---|---|---|---|---|
| | Average reflectance [%] | Haze [%] | Visible light transmittance [%] | Sunlight transmittance [%] |
| Example 4 | 74 | 1.5 | 83 | 64 |
| Example 5 | 70 | 0.9 | 87 | 67 |

Examples 6 and 7

The near-infrared ray shielding films obtained in Examples 4 and 5 were joined together to obtain a laminated glass in the same manner as in Example 3. When the appearance (existence of wrinkles, inclusion of air, glare and burrs) of the obtained laminated glass was evaluated, it had none of these defects. Thus, a laminated glass having a very good appearance was obtained.

As described above, according to the present invention, there can be provided a near-infrared ray shielding film which has high adhesion between layers, is substantially transparent, can shield a wide near-infrared range at a high level and is free from electromagnetic interference.

Since the near-infrared ray shield film of the present invention can obtain high shielding properties at a wide near-infrared range, by using it to be laminated in the window of a building or automobile, a rise in the inside temperature of a room caused by the input of a heat ray can be suppressed when sunlight is strong and the escape of heat to the outside from the inside can be controlled when sunlight is weak and a heater is used. Therefore, the use efficiency of energy can be greatly improved, thereby contributing to energy saving.

The invention claimed is:

1. A near-infrared ray shielding film comprising:
   a first laminated film portion consisting of at least 101 alternate layers: (1) 0.1 to 0.2 μm-thick first layers made of a first aromatic polyester having a melting point of 250 to 260° C. and comprising ethylene terephthalate as the main recurring unit and (2) 0.09 to 0.22 μm-thick second layers made of a second aromatic polyester having a melting point of 200 to 245° C. and comprising ethylene terephthalate as the main recurring unit, wherein
   the melting point of the second aromatic polyester is 15 to 60° C. lower than the melting point of the first aromatic polyester, and combinations of the adjacent first layer and second layer whose thickness is 0.9 to 1.1 times the thickness of the first layers account for 70% or more of the total; and
   a second laminated film portion which is identical to the first laminated film portion except that the average thickness of the first layers and the second layers of the second laminated film portion is 1.05 to 1.6 times the average thickness of the first layers and the second layers of the first laminated film portion.

2. The near-infrared ray shielding film according to claim 1, wherein the first layers of the first laminated film portion and the first layers of the second laminated film portion are biaxially oriented and the second layers of these portions are substantially unoriented.

3. The near-infrared ray shielding film according to claim 1 which has an average reflectance for light having a wavelength of 800 to 1,100 nm of 50% or more.

4. The near-infrared ray shielding film according to claim 1 which has a visible light transmittance of 80% or more, a sunlight transmittance of 75% or less and a haze of 1.5% or less.

5. The near-infrared ray shielding film according to any one of claims 1 to 4 which is used to be laminated in the window of a building or an automobile.

6. A laminated glass comprising the near-infrared ray shielding film of claim 1 sandwiched between two glass plates through polyvinyl butyral sheets.

* * * * *